(12) United States Patent
Lee

(10) Patent No.: US 11,067,398 B1
(45) Date of Patent: Jul. 20, 2021

(54) INDOOR POSITIONING METHOD, ELECTRONIC DEVICE AND READABLE STORAGE MEDIUM

(71) Applicant: NANNING FUGUI PRECISION INDUSTRIAL CO., LTD., Nanning (CN)

(72) Inventor: Yang-Han Lee, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/862,837

(22) Filed: Apr. 30, 2020

(30) Foreign Application Priority Data

Apr. 29, 2020 (CN) .......................... 202010359076.9

(51) Int. Cl.
| | |
|---|---|
| *G01C 21/20* | (2006.01) |
| *H04B 17/318* | (2015.01) |
| *G01S 5/04* | (2006.01) |
| *G01S 5/14* | (2006.01) |

(52) U.S. Cl.
CPC .............. *G01C 21/206* (2013.01); *G01S 5/04* (2013.01); *G01S 5/14* (2013.01); *H04B 17/318* (2015.01)

(58) Field of Classification Search
CPC .......... G01C 21/206; G01S 5/04; G01S 5/14; H04B 17/318
See application file for complete search history.

(56) References Cited

U.S. PATENT DOCUMENTS

| | | | | |
|---|---|---|---|---|
| 10,660,062 | B1 * | 5/2020 | Yin ........................ | H04W 4/027 |
| 2006/0199546 | A1 * | 9/2006 | Durgin ................. | H04B 17/318 |
| | | | | 455/67.11 |
| 2015/0358781 | A1 * | 12/2015 | Chen ..................... | H04W 4/023 |
| | | | | 455/456.1 |
| 2019/0101632 | A1 * | 4/2019 | Ebido ..................... | G01S 11/06 |
| 2020/0305111 | A1 * | 9/2020 | Kuang .................. | H04W 24/08 |

* cited by examiner

*Primary Examiner* — Minjung Kim
(74) *Attorney, Agent, or Firm* — ScienBiziP, P.C.

(57) ABSTRACT

An indoor positioning method detects a moving object defines a possible location area of the moving objects according to errors calculated by RSSI values of the moving object, and calculates RSSI moving vectors between the moving object and wireless devices according to the RSSI values to predict an exact position of the moving object according to the dependency of the RSSI moving vectors and relative angular positions of the moving object. The high relevance feature between CCI of multi-nodes and CINR is transformed as vectors and the vectors are compared with the RSSI moving vectors to calculate a RMSE value. When the root mean square error is less than a preset threshold value, the exact position of the moving object can be obtained.

9 Claims, 6 Drawing Sheets

INDOOR POSITIONING METHOD, ELECTRONIC DEVICE AND READABLE STORAGE MEDIUM

BACKGROUND

1. Technical Field

The disclosure relates to positioning methods, and more particularly to an indoor positioning method based on received signal strength indication (RSSI), electronic device, and readable storage medium.

2. Description of Related Art

Existing indoor positioning methods determine the positions of a mobile device by calculating received signal strength indication (RSSI) values of the mobile device. A receiver, for example, the mobile device, receives wireless signals from multiple stations. Signal attenuations with different degrees of the stations are resulted from different distances of the stations from the mobile device. Each of the distances of the stations from the mobile device is calculated according to the signal attenuations. Therefore, the distances are substituted into a triangle positioning method to calculate the coordinates of the mobile device.

However, RSSI value may be distorted as there is anything causing signal attenuations is provided indoor, for example, decorations or crowded people, resulting in low RSSI practicality and inaccurate positioning effect.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
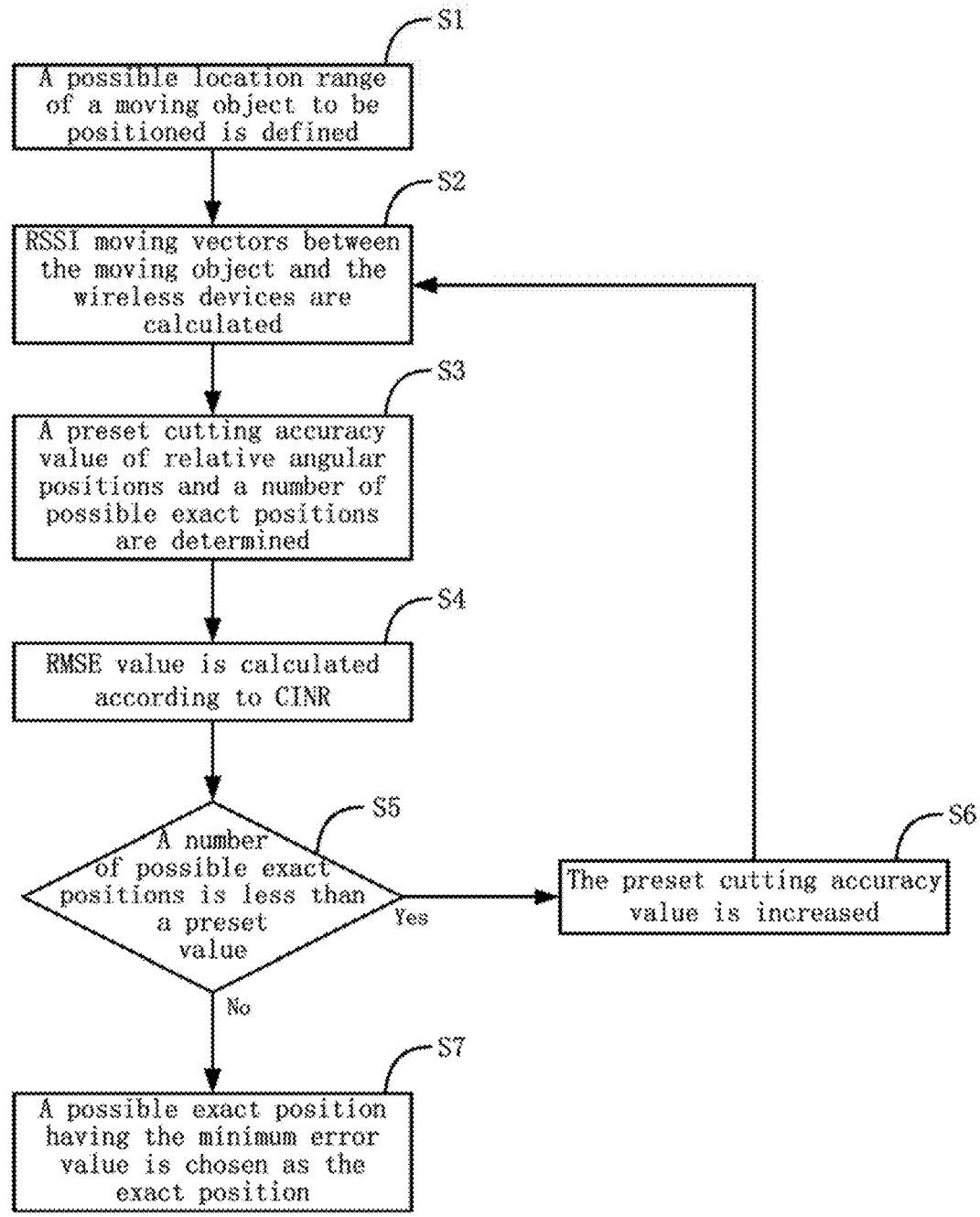
FIG. 1 is a flowchart of an embodiment of an indoor positioning method of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

An embodiment of an indoor positioning method detects a moving object, for example, human, a mobile device or an automated moving device, defines a possible location area of the moving objects according to errors calculated by RSSI values of the moving object, and calculates RSSI moving vectors between the moving object and wireless devices according to the RSSI values to predict an exact position of the moving object according to the dependency of the RSSI moving vectors and relative angular positions of the moving object. The high relevance feature between co-channel interference (CCI) of multi-nodes and Carrier to Interference-plus-Noise Ratio (CINR) is transformed as vectors and the vectors are compared with the RSSI moving vectors to calculate a root mean square error (R.M.S.E.) value. When the root mean square error is less than a preset threshold value, the exact position of the moving object can be obtained.

FIG. 1 is a flowchart of an embodiment of an indoor positioning method of the present disclosure.

In block S1, a possible location range of a moving object to be positioned is defined according to an error of a first received signal strength indication (RSSI) value, a second RRSI value and a third RSSI value between the moving object to be positioned and at least a first wireless device, a second wireless device, and a third wireless device. The signal strength $P_{RX}$ is calculated using equation (1) as shown in the following:

$$P_{RX} = P_{TX} \times G_{RX} \times G_{TX} \times \left(\frac{\lambda}{4\pi d}\right)^2. \tag{1}$$

Figure 2A:
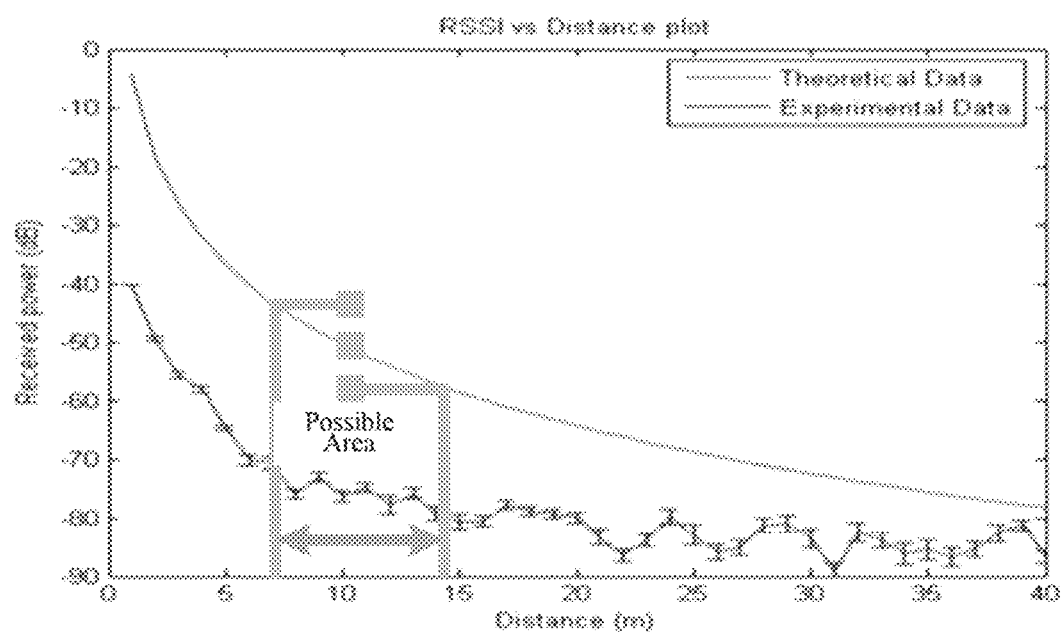
FIG. 2A and FIG. 2B are schematic diagrams of an embodiment of a possible location range of an object to be positioned of the present disclosure.
Figure 2B:
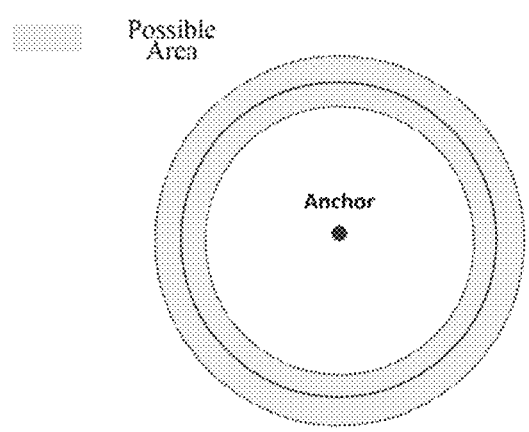

$P_{RX}$ means the power transmitted at the receiver, $P_{TX}$ means the power remaining at the receiver, $G_{RX}$ means the receiver gain, $G_{TX}$ means the transmitter gain, $\lambda$ means the wavelength, and d means the distance between the transmitter and the receiver. When the $P_{RX}$ is calculated, the RSSI value is calculated using other equations, which is not further described herein. The possible locations of the moving object to be positioned (TBP) are shown in FIGS. 2A and 2B.

An embodiment of the invention provides at least three wireless devices, for example, comprising wireless access points (APs) Acchor1, Acchor2, and Acchor3. Three RSSI values, for example, a first RSSI value, a second RSSI value, and a third RSSI value, can be obtained through the moving object to be positioned and the wireless APs Acchor1, Acchor2, and Acchor3.

In block S2, a first RSSI moving vector, a second RSSI moving vector and a third RSSI moving vector between the moving object to be positioned and the first wireless device, the second wireless device, and the third wireless device are calculated according to the first RSSI value, the second RRSI value and the third RSSI value. Possible exact positions of the moving object to be positioned in the possible location range are defined according to the dependency of the first, second and third RSSI moving vectors of the moving object to be positioned and relative angular positions between the moving object to be positioned and the first, second and third wireless devices.

Figure 3:
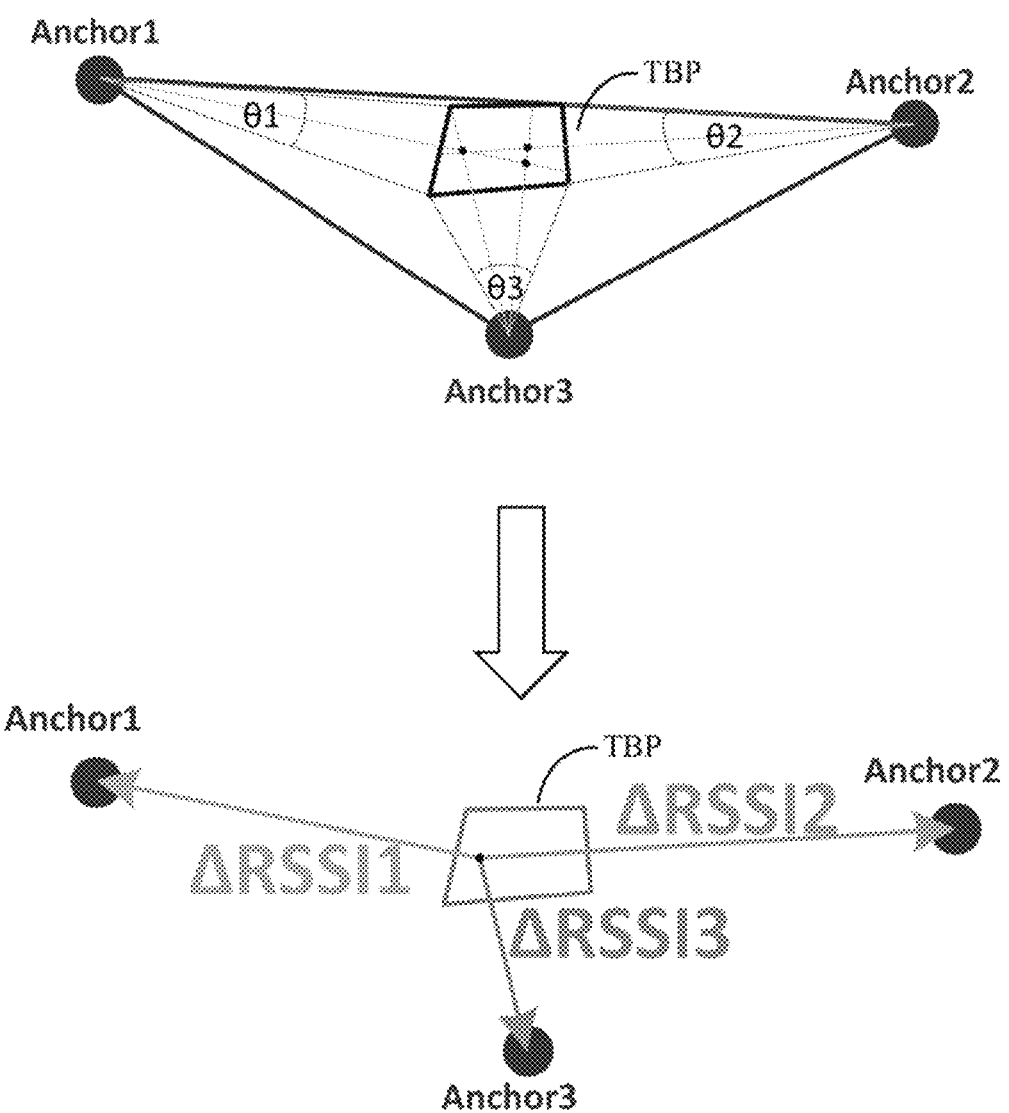
FIG. 3 is a schematic diagram of an embodiment of RSSI motion vectors of the object to be positioned of the present disclosure.

Referring to FIG. 3, the relative angles between the wireless APs Acchor1, Acchor2 and Acchor3 and the moving object to be positioned is θ1, θ2 and θ3. A first RSSI moving vector, a second RSSI moving vector and a third RSSI moving vector between the moving object to be positioned and the wireless APs Acchor1, Acchor2, and Acchor3 are represented as $\Delta RSSI_1$, $\Delta RSSI_2$ and $\Delta RSSI_3$. The RSSI moving vectors are calculated using the equation (2) as shown in the following:

$$\overline{\Delta RSSI} = \Delta RSSI_1 * \vec{i} + \Delta RSSI_2 \vec{j} + \Delta RSSI_3 \vec{k} \qquad (2)$$

In block S3, a preset cutting accuracy value of relative angular positions and a number of possible exact positions of the moving object to be positioned are determined according to weights of the first RSSI moving vector, the second RSSI moving vector and the third RSSI moving vector and the total angle between the moving object in the possible location area and the first, second and third wireless devices. The cutting accuracy value U is calculated using the equation (3) as shown in the following:

$$(\text{RESOLUTION})_i = \left(\frac{\left(\sum_{i=1}^{N} \theta_i\right)}{U}\right) \times \left(\frac{|\Delta RSSI_1|}{\sum_{i=1}^{N} |\Delta RSSI_1|}\right). \qquad (3)$$

Further, "i" in equation (6) is replaced by "n".

$$\text{Error}(r, m, s) = \sqrt{\frac{\left|\frac{\Delta RSSI_1}{\sum_{i \neq 1}^{N} \Delta RSSI_n} - \Delta CINR_1\right|^2 - \left|\frac{\Delta RSSI_2}{\sum_{i \neq 2}^{N} \Delta RSSI_n} - \Delta CINR_2\right|^2 - \left|\frac{\Delta RSSI_3}{\sum_{i \neq 3}^{N} \Delta RSSI_n} - \Delta CINR_3\right|^2}{|\Delta CINR_1|^2 + |\Delta CINR_2|^2 + |\Delta CINR_3|^2}} \times 100\%. \qquad (6)$$

Figure 4:
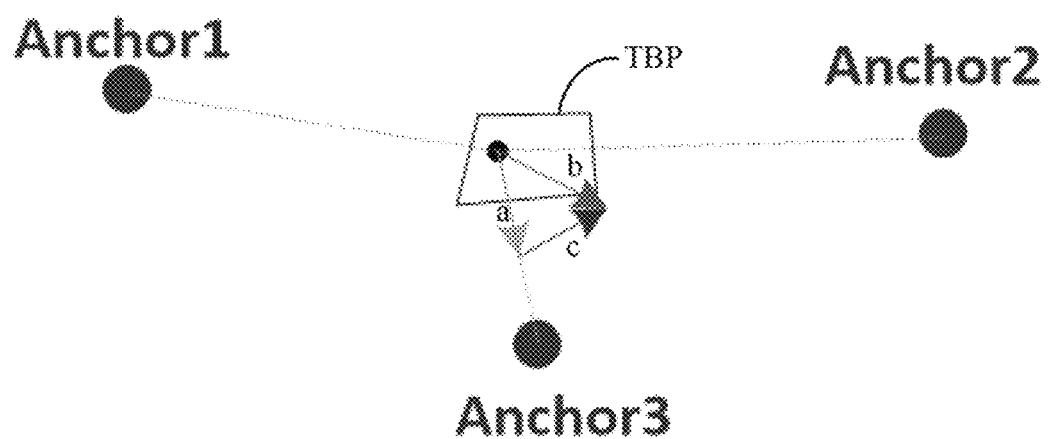
FIG. 4 is a schematic diagram of an embodiment of a root mean square error (R.M.S.E.) of the object to be positioned of the present disclosure.

In block S4, the carrier to the interference-plus-noise ratio (CINR) is transformed as vectors using the equations (5) and (6), and the vectors is compared with the first, second and third RSSI moving vectors to calculate a root mean square error (RMSE) value. Referring to FIG. 4, "a" indicates the RRS moving vector, "b" indicates the vectors transformed from the CINR, and "c" indicates the error vector. A candidate position of the moving object to be positioned is obtained when the RMSE value is less than a preset threshold value. The equations (5) and (6) are shown in the following:

$$\Delta CINR_1 \vec{i} + \Delta CINR_2 \vec{j} + \Delta CINR_3 \vec{k} \Leftrightarrow \frac{\Delta RSSI_1}{\sum_{n \neq 1}^{N} \Delta RSSI_n} \vec{i} + \frac{\Delta RSSI_2}{\sum_{n \neq 2}^{N} \Delta RSSI_n} \vec{j} + \frac{\Delta RSSI_3}{\sum_{n \neq 3}^{N} \Delta RSSI_n} \vec{k}; \qquad (5)$$

and $$\text{Error}(r, m, s) = \sqrt{\frac{\left|\frac{\Delta RSSI_1}{\sum_{i \neq 1}^{N} \Delta RSSI_n} - \Delta CINR_1\right|^2 - \left|\frac{\Delta RSSI_2}{\sum_{i \neq 2}^{N} \Delta RSSI_n} - \Delta CINR_2\right|^2 - \left|\frac{\Delta RSSI_3}{\sum_{i \neq 3}^{N} \Delta RSSI_n} - \Delta CINR_3\right|^2}{|\Delta CINR_1|^2 + |\Delta CINR_2|^2 + |\Delta CINR_3|^2}} \times 100\%. \qquad (6)$$

In block S5, it is determined whether a number of possible exact positions of the moving object to be positioned is less than a preset value, for example, 1, according to the RMSE value.

In block S6, the preset cutting accuracy value is increased, and the foregoing steps of the indoor positioning method is repeated if the RMSE value is less than the preset value.

In block S7, a possible exact position having the minimum error value is chosen as the exact position of the moving object to be positioned if the RMSE value is not less than the preset value.

Figure 5:
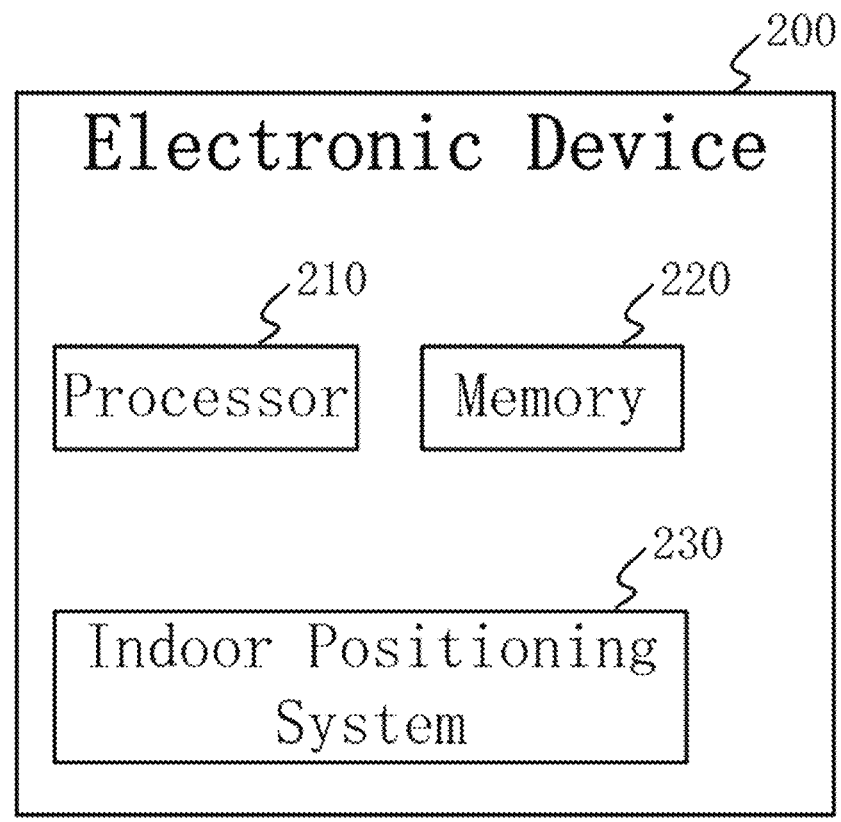
FIG. 5 is a block diagram of an embodiment of the hardware architecture of an electronic device using the method of the present disclosure.

FIG. 5 is a block diagram of an embodiment of the hardware architecture of an electronic device using the indoor positioning method of the present disclosure. The electronic device 200 may, but is not limited to, connect to a processor 210, a memory 220, and an indoor positioning system 230 via system buses. The electronic device 200 shown in FIG. 5 may include more or fewer components than those illustrated, or may combine certain components.

The memory 220 stores a computer program, such as the indoor positioning system 230, which is executable by the processor 210. When the processor 210 executes the indoor positioning system 230, the blocks in one embodiment of the booting mode configuration method applied in the electronic device 200 are implemented, such as blocks S1 to S7 shown in FIG. 1.

It will be understood by those skilled in the art that FIG. 5 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the indoor positioning system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The indoor positioning system 230 can be partitioned into one or more modules/units that are stored in the memory 220 and executed by the processor 210. The one or more modules/units may be a series of computer program instructions capable of performing particular functions of the indoor positioning system 230.

Figure 6:
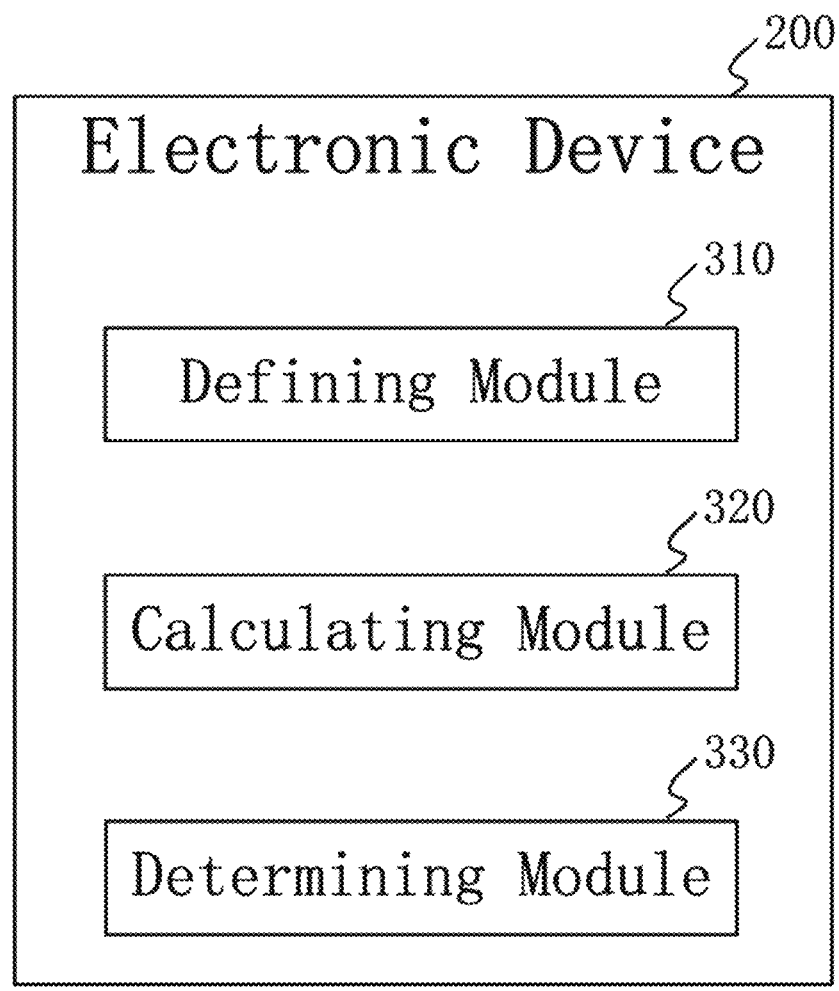
FIG. 6 is a schematic diagram of an embodiment of functional blocks of the electronic device using the method of the present disclosure.

FIG. 6 is a schematic diagram of an embodiment of functional blocks of the electronic device using the method of the present disclosure.

The electronic device 200 comprises a defining module 310, a calculating module 320, and a determining module 330.

The defining module 310 defines a possible location range of a moving object to be positioned according to an error of a first received signal strength indication (RSSI) value, a second RRSI value, and a third RSSI value between the moving object to be positioned and at least a first wireless device, a second wireless device and a third wireless device. The signal strength $P_{RX}$ is calculated using equation (1) as shown in the following:

$$P_{RX} = P_{TX} \times G_{RX} \times G_{TX} \times \left(\frac{\lambda}{4\pi d}\right)^2. \qquad (1)$$

$P_{RX}$ means the power transmitted at the receiver, $P_{TX}$ means the power remaining at the receiver, $G_{RX}$ means the receiver gain, $G_{TX}$ means the transmitter gain, A means the wavelength, and d means the distance between the transmitter and the receiver. When the $P_{RX}$ is calculated, the RSSI value is calculated using other equations, which is not further described herein. The possible locations of the moving object to be positioned (TBP) are shown in FIGS. 2A and 2B.

An embodiment of the invention provides at least three wireless devices, for example, comprising wireless access points (APs) Acchor1, Acchor2, and Acchor3. Three RSSI values, for example, a first RSSI value, a second RSSI value, and a third RSSI value, can be obtained through the moving object to be positioned and the wireless APs Acchor1, Acchor2, and Acchor3.

The calculating module 320 calculates a first RSSI moving vector, a second RSSI moving vector and a third RSSI moving vector between the moving object to be positioned and the first wireless device, the second wireless device, and the third wireless device according to the first RSSI value, the second RRSI value and the third RSSI value. Possible exact positions of the moving object to be positioned in the possible location range are defined according to the dependency of the first, second and third RSSI moving vectors of the moving object to be positioned and relative angular positions between the moving object to be positioned and the first, second and third wireless devices.

Referring to FIG. 3, the relative angles between the wireless APs Acchor1, Acchor2, and Acchor3 and the moving object to be positioned is θ1, θ2 and θ3. A first RSSI moving vector, a second RSSI moving vector, and a third RSSI moving vector between the moving object to be positioned and the wireless APs Acchor1, Acchor2 and Acchor3 are represented as $\Delta RSSI_1$, $\Delta RSSI_2$ and $\Delta RSSI_3$. The RSSI moving vectors are calculated using the equation (2) as shown in the following:

$$\overrightarrow{\Delta RSSI} = \Delta RSSI_1 \vec{i} + \Delta RSSI_2 \vec{j} + \Delta RSSI_3 \vec{k} \qquad (2)$$

The calculating module 320 determines a preset cutting accuracy value of relative angular positions and a number of possible exact positions of the moving object to be positioned according to weights of the first RSSI moving vector, the second RSSI moving vector and the third RSSI moving vector and the total angle between the moving object in the possible location area and the first, second and third wireless devices. The cutting accuracy value is calculated using the equation (3) as shown in the following:

$$(\text{RESOLUTION})_i = \left(\frac{\left(\sum_{i=1}^{N} \theta_i\right)}{U}\right) \times \left(\frac{|\Delta RSSI_i|}{\sum_{i=1}^{N} |\Delta RSSI_i|}\right). \qquad (3)$$

In block S4, The calculating module 320 transforms the carrier to interference-plus-noise ratio (CINR) as vectors using the equations (5) and (6) and compares the vectors with the first, second and third RSSI moving vectors to calculate a root mean square error (RMSE) value. Referring to FIG. 4, "a" indicates the RRS moving vector, "b" indicates the vectors transformed from the CINR and "c" indicates the error vector. A candidate position of the moving object to be positioned is obtained when the RMSE value is less than a preset threshold value. The equations (5) and (6) are shown in the following:

$$\Delta CINR_1 \vec{i} + \Delta CINR_2 \vec{j} + \qquad (5)$$

$$\Delta CINR_3 \vec{k} \Leftrightarrow \frac{\Delta RSSI_1}{\sum\limits_{n \neq 1}^{N} \Delta RSSI_n}\vec{i} + \frac{\Delta RSSI_2}{\sum\limits_{n \neq 2}^{N} \Delta RSSI_n}\vec{j} + \frac{\Delta RSSI_3}{\sum\limits_{n \neq 3}^{N} \Delta RSSI_n}\vec{k};$$

and $$\text{Error}(r, m, s) = \sqrt{\frac{\left|\frac{\Delta RSSI_1}{\sum\limits_{i \neq 1}^{N} \Delta RSSI_n} - \Delta CINR_1\right|^2 - }{\left|\frac{\Delta RSSI_2}{\sum\limits_{i \neq 2}^{N} \Delta RSSI_n} - \Delta CINR_2\right|^2 - \atop \left|\frac{\Delta RSSI_3}{\sum\limits_{i \neq 3}^{N} \Delta RSSI_n} - \Delta CINR_3\right|^2}{|\Delta CINR_1|^2 + |\Delta CINR_2|^2 + |\Delta CINR_3|^2}} \times 100\%. \qquad (6)$$

The determining module 330 determines whether a number of possible exact positions of the moving object to be positioned is less than a preset value, for example, 1, according to the RMSE value. The determining module 330 increases the preset cutting accuracy value and the foregoing steps of the indoor positioning method are repeated if the RMSE value is less than the preset value. The determining module 330 chooses a possible exact position having the minimum error value as the exact position of the moving object to be positioned if the RMSE value is not less than the preset value.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An indoor positioning method executable by an electronic device, comprising:
    defining a possible location range of a moving object to be positioned according to an error of a first received signal strength indication (RSSI) value, a second RRSI value, and a third RSSI value between the moving object to be positioned and at least a first wireless device, a second wireless device, and a third wireless device;
    calculating a first RSSI moving vector, a second RSSI moving vector, and a third RSSI moving vector between the moving object to be positioned, and the first wireless device, the second wireless device and the third wireless device according to the first RSSI value, the second RRSI value, and the third RSSI value;
    defining possible exact positions of the moving object to be positioned in the possible location range according to a dependency of the first, second, and third RSSI moving vectors of the moving object to be positioned and relative angular positions between the moving object to be positioned and the first, second, and third wireless devices;
    determining a preset cutting accuracy value of relative angular positions and a number of possible exact positions of the moving object to be positioned according to weights of the first RSSI moving vector, the second RSSI moving vector, and the third RSSI moving vector and the total angle between the moving object in the possible location area and the first, second, and third wireless devices;
    transforming the carrier to interference-plus-noise ratio (CINR) as vectors and comparing the vectors with the first, second, and third RSSI moving vectors to calculate a root mean square error (RMSE) value;
    determining whether a number of possible exact positions of the moving object to be positioned is less than a preset value according to the RMSE value; and
    choosing a possible exact position having the minimum error value as the exact position of the moving object to be positioned if the RMSE value is not less than the preset value.

2. The method of claim 1, further comprising:
    increasing the preset cutting accuracy value and repeating the foregoing steps of the indoor positioning method if the RMSE value is less than the preset value.

3. The method of claim 1, further comprising:
    obtaining a candidate position of the moving object to be positioned when the RMSE value is less than a preset threshold value.

4. An electronic device, comprising:
    a defining module defining a possible location range of a moving object to be positioned according to an error of a first RSSI value, a second RRSI value, and a third RSSI value between the moving object to be positioned and at least a first wireless device, a second wireless device, and a third wireless device;
    a calculating module calculating a first RSSI moving vector, a second RSSI moving vector, and a third RSSI moving vector between the moving object to be positioned and the first wireless device, the second wireless device, and the third wireless device according to the first RSSI value, the second RRSI value, and the third RSSI value, defining possible exact positions of the moving object to be positioned in the possible location range according to a dependency of the first, second and third RSSI moving vectors of the moving object to be positioned and relative angular positions between the moving object to be positioned and the first, second, and third wireless devices, determining a preset cutting accuracy value of relative angular positions and a number of possible exact positions of the moving object to be positioned according to weights of the first RSSI moving vector, the second RSSI moving vector, and the third RSSI moving vector and the total angle between the moving object in the possible location area and the first, second, and third wireless devices; and transforming the carrier to interference-plus-noise ratio (CINR) as vectors and comparing the vectors with the first, second and third RSSI moving vectors to calculate a root mean square error (RMSE) value; and
    a determining module determining whether a number of possible exact positions of the moving object to be positioned is less than a preset value according to the RMSE value, and choosing a possible exact position having the minimum error value as the exact position of the moving object to be positioned if the RMSE value is not less than the preset value.

5. The device of claim 4, wherein, if the RMSE value is less than the preset value, the determining module increases the preset cutting accuracy value and the foregoing steps of the indoor positioning method are repeated.

6. The device of claim 4, wherein a candidate position of the moving object to be positioned is obtained when the RMSE value is less than a preset threshold value.

7. A tangible non-transitory computer-readable storage medium having stored thereon executable instructions that when executed by a processor of a computer controls the computer to perform steps, the steps comprising:
    an executable portion configured to define a possible location range of a moving object to be positioned according to an error of a first received signal strength indication (RSSI) value, a second RRSI value, and a third RSSI value between the moving object to be positioned and at least a first wireless device, a second wireless device, and a third wireless device;
    an executable portion configured to calculate a first RSSI moving vector, a second RSSI moving vector, and a third RSSI moving vector between the moving object to be positioned, and the first wireless device, the second wireless device and the third wireless device according to the first RSSI value, the second RRSI value, and the third RSSI value;
    an executable portion configured to define possible exact positions of the moving object to be positioned in the possible location range according to a dependency of the first, second, and third RSSI moving vectors of the moving object to be positioned and relative angular positions between the moving object to be positioned and the first, second, and third wireless devices;

an executable portion configured to determine a preset cutting accuracy value of relative angular positions and a number of possible exact positions of the moving object to be positioned according to weights of the first RSSI moving vector, the second RSSI moving vector, and the third RSSI moving vector and the total angle between the moving object in the possible location area and the first, second, and third wireless devices;

an executable portion configured to transform the carrier to interference-plus-noise ratio (CINR) as vectors and comparing the vectors with the first, second, and third RSSI moving vectors to calculate a root mean square error (RMSE) value;

an executable portion configured to determine whether a number of possible exact positions of the moving object to be positioned is less than a preset value according to the RMSE value; and an executable portion configured to choose a possible exact position having the minimum error value as the exact position of the moving object to be positioned if the RMSE value is not less than the preset value.

8. The tangible non-transitory computer-readable storage medium of claim 7, further comprising:

an executable portion configured to increase the preset cutting accuracy value and repeating the foregoing steps of the indoor positioning method if the RMSE value is less than the preset value.

9. The tangible non-transitory computer-readable storage medium of claim 7, further comprising:

an executable portion configured to obtain a candidate position of the moving object to be positioned when the RMSE value is less than a preset threshold value.

* * * * *